INVENTOR.
JOHN H. JEFFREE
BY Brumbaugh, Free, Graves & Donohue
his ATTORNEYS

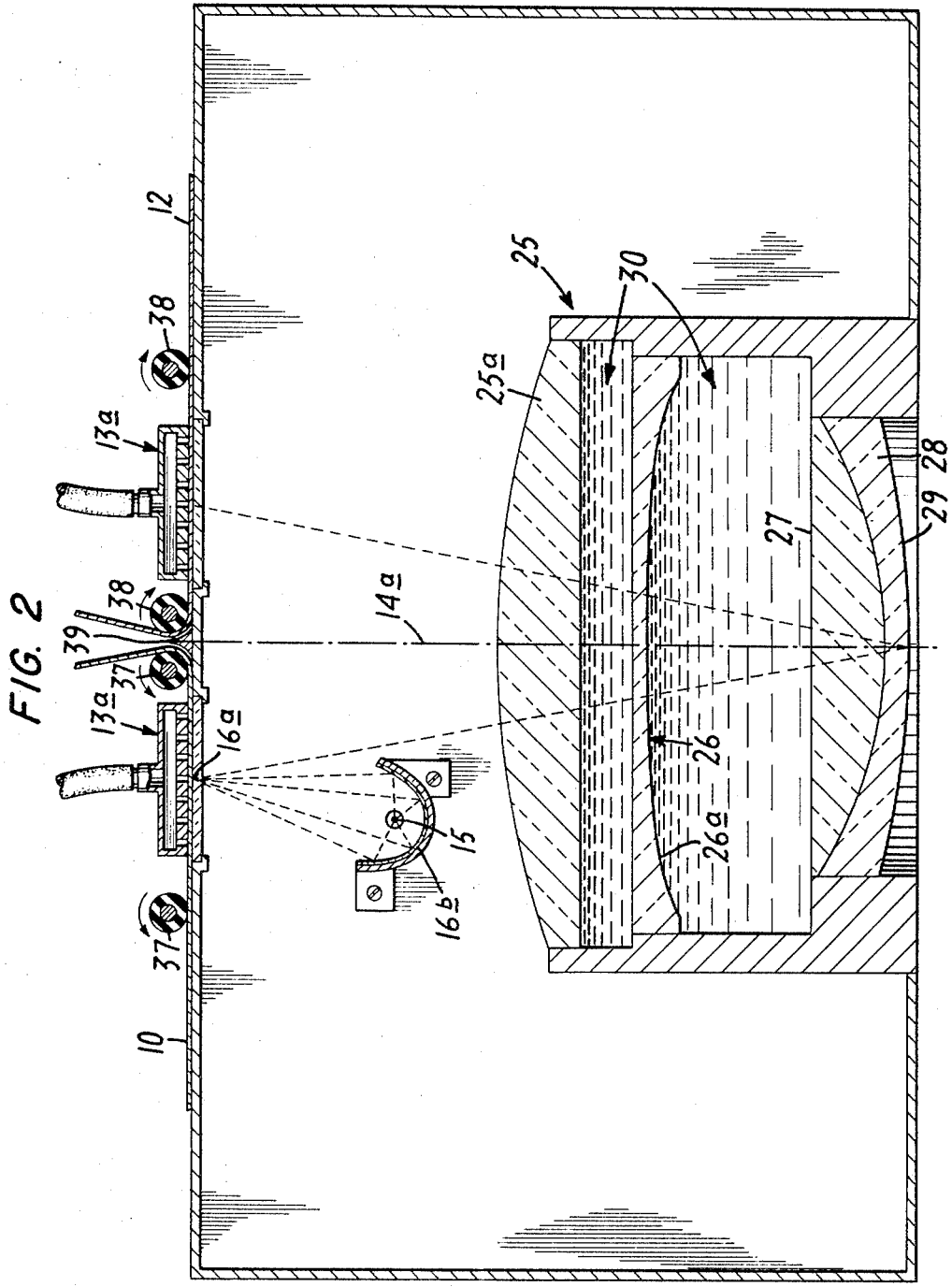

United States Patent Office 3,364,816
Patented Jan. 23, 1968

3,364,816
HIGH INTENSITY REFLECTION COPYING SYSTEM
John H. Jeffree, London, England, assignor to Caps (Research) Limited, London, England
Filed Aug. 11, 1965, Ser. No. 478,846
Claims priority, application Great Britain, Aug. 18, 1964, 33,693/64
28 Claims. (Cl. 88—24)

ABSTRACT OF THE DISCLOSURE

In the particular embodiments of the invention described herein, an object to be copied is imaged on a sheet of sensitized paper by a catadioptric lens system utilizing an aspheric lens element immersed in water. In one embodiment, the object to be copied and the sensitized paper are disposed in spaced parallel planes and the catadioptric lens system is moved in a direction parallel to the planes and midway between them, mirrors being provided to reflect light through the lens system. In another embodiment the lens system is stationary and the object and sensitized paper are simultaneously driven toward each other at corresponding positions adjacent to but on opposite sides of the lens axis.

---

Figure 1:
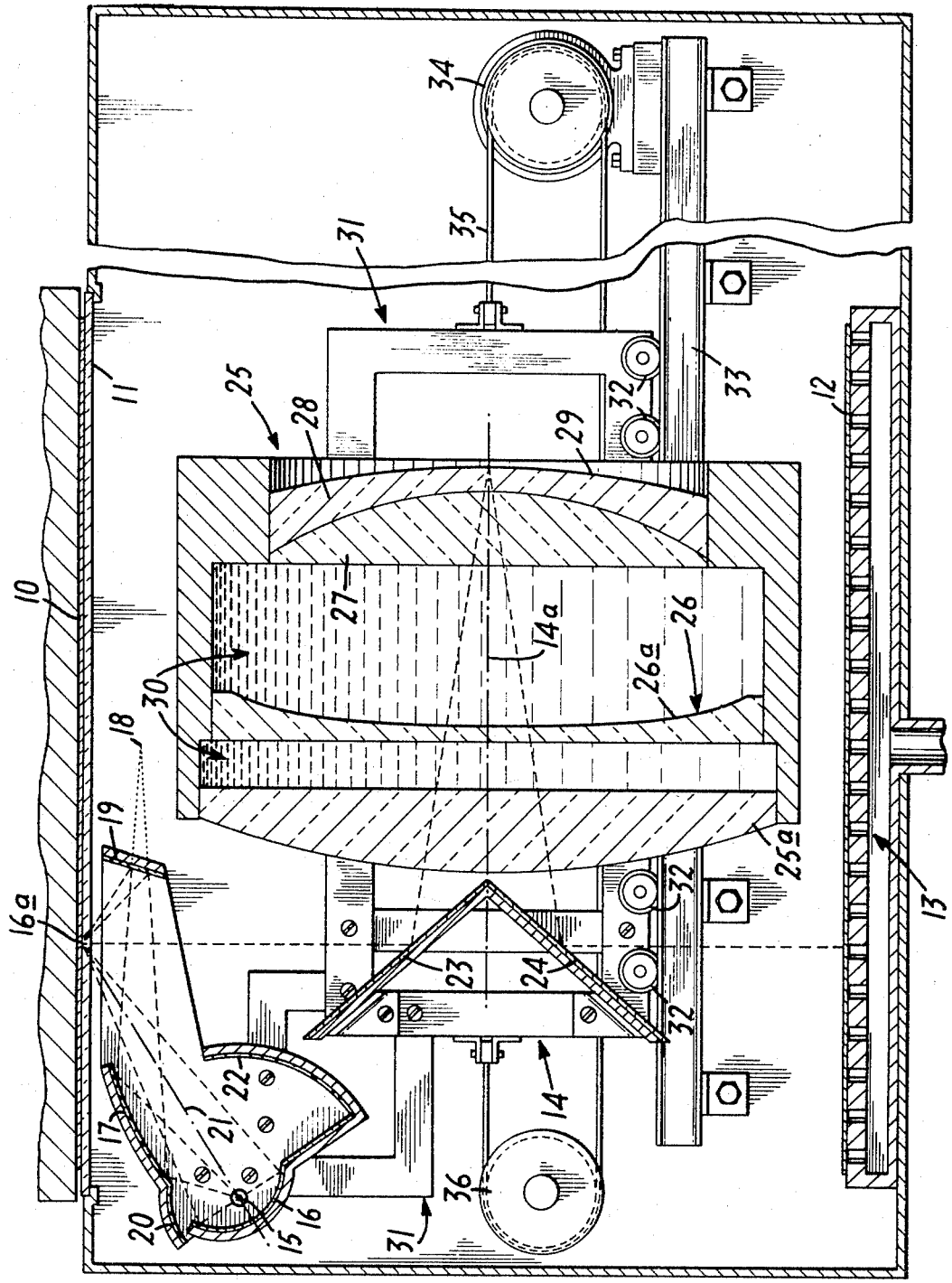

This invention relates to reflection copying systems and, more particularly, to a new and improved reflection copying system capable of utilizing copy papers having a very low sensitivity.

Diazo paper is one of the most convenient sensitised materials for use in photographic copying apparatus since it is cheap, relatively insensitive to light and can therefore be used in a lighted room, and is capable of easy development. On the other hand, a major disadvantage of diazo paper is one which arises from its insensitivity to light. For example, using a 1500 w. mercury lamp as a source and illuminating an object as efficiently as possible it is found that an image projection system must have an angular aperture of 30 to 40 degrees (f/2 to f/1.4) to make 8 inches x 13 inches copies on fast diazo papers in 10 to 20 seconds, assuming moderate transmission losses. Certain other convenient sensitised materials are subject to the same disadvantage. In other words, making copies on diazo papers and similar materials at practical speeds calls for an image projection system of about this size of aperture. Further, this angular aperture must be maintained over a field diameter of about 10 inches with visually acceptable definition.

For this reason diazo and other relatively insensitive papers have been used for contact printing, the paper being placed in contact with a transparent object and an image formed by light transmitted through the object and on to the paper. Clearly contact printing is unsuitable for making copies of books, papers etc. which are not transparent.

Accordingly, it is an object of the present invention to provide a new and improved high intensity reflection copying system which overcomes the above-mentioned difficulties.

Another object of the present invention is to provide an optical system for use with low sensitivity copying materials which provides an exceptionally well-corrected image over a very large field area.

These and other objects of the invention are attained by providing a high speed lens means optically interposed between the object to be copied and the sensitised material. The lens means preferably includes concave reflecting means, converging lens means disposed between the said reflecting means and the centre of curvature thereof and adapted substantially to compensate for curvature of field arising at the reflecting means, and aspheric lens means including an aspheric surface disposed between the reflecting means and the centre of curvature thereof and adapted substantially to compensate for astigmatic aberrations arising at the reflecting means and spherical aberrations arising at the convex surface of the converging lens means.

Preferably, the aspheric lens means is disposed between the reflecting means and the converging lens means.

Preferably, the converging lens means includes a convex surface which faces in a direction away from the reflecting means and the aspheric surface faces the reflecting means.

In this image projection means the converging lens means may be a convex lens, in which case the aspheric lens means is preferably an aspheric plate.

Alternatively, there may be provided a single lens element having a first surface which forms the aspheric surface of the aspheric lens means and a second surface which forms the convex surface of the converging lens means.

Means for substantially correcting chromatic aberrations in the projection means may be disposed between the aspheric lens means and the reflecting means. These correcting means are preferably a doublet of crown and flint glass, the cemented surface of the flint glass being concave.

Suitably, a doublet of crown and flint glass for correcting chromatic aberration has an outer, convex surface thereof adapted to form the concave reflecting means of the projection means.

According to another aspect of the invention, the lens means includes aspheric correcting means having a refractive index which differs from the index of the adjacent medium by a relatively low value so as to permit a relatively large manufacturing tolerance for the aspheric surface. To this end, the aspheric lens means is preferably immersed in a liquid medium of lower refractive index such as water. Moreover, it is preferably made of a synthetic plastic material such as "Perspex," which not only has a lower refractive index than most glasses but also is relatively easier to form to an aspheric surface than glass.

According to a preferred embodiment, the high speed lens means includes an outer convex element made of glass, an inner convex element made of glass and having a reflective rear surface so that light transmitted from the object through the lens is reflected back through the lens to the image plane, and an aspheric correcting element immersed in water between the outer and inner lens elements to correct aberrations and distortions over a wide field.

Also unwanted reflections are reduced by means of the water or other transparent liquid disposed adjacent to the aspheric surface and, in the case where the aspheric surface and the convex surface are not formed on the same lens element, between the aspheric and the converging lens means.

The invention also includes apparatus for copying having first retaining means for holding an object to be copied at a first location, second retaining means for holding sensitised material at a second location spaced from the first location, and image projection means for producing at the second location an image of an object disposed at the first location, the image projection means comprising concave reflecting means, converging lens means disposed between the said reflecting means and the centre of curvature thereof and including a convex surface which faces in a direction away from the reflecting means and is adapted substantially to compensate for curvature of field aberrations arising at the reflecting means, and aspheric lens means disposed between the reflecting means and the converging lens means and including a generally concave, aspheric surface which faces the reflecting means and is adapted substantially to compensate for astigmatic aberrations arising at the reflecting means and spherical aberrations arising at the convex surface of the converging lens means.

The first and second locations may be spaced from the concave reflecting means of the image projection means by a distance substantially equal to the effective radius of curvature of the reflecting means.

One form of copying system according to the invention adapted to produce on photosensitised sheet material copies of rigid objects such as hard cover books, as well as flexible documents, comprises mounts for the object and the sensitised sheet so arranged that the object and sensitised sheet are held in parallel planes a fixed distance apart (with the copy surface of the object facing the sensitised surface of the photosensitised sheet in use), an optical projection system including the above-mentioned lens means mounted between and at a fixed distance from the parallel planes containing the object and sensitised sheet and arranged to project an image of a transverse strip element of the object on to the sensitised sheet with reversal of the image in a direction parallel with the length of the element but without reversal of the image in the perpendicular direction to the strip element, and means for imparting a relative movement in the last mentioned direction between the optical projection system on the one hand and the object and photosensitised sheet on the other hand, whereby successive transverse strip elements of the object may be successively imaged on to the photosensitised sheet.

This form of the invention also includes an optical system for illuminating a strip element of an object comprising a first cylindrical reflecting surface, an elongated light source mounted between the first reflecting surface and the element, whereby light emitted rearwardly from the source is reflected forwardly on to the element, a second cylindrical reflecting surface of part-elliptical section arranged forwardly of the first reflecting surface and with the light source disposed at one line focus thereof, whereby light from the source is reflected towards a second line focus of the second reflecting surface, and further reflecting surface means arranged to reflect light travelling towards the said second line focus on to the element. Preferably, the light source is a tubular discharge lamp which is also disposed at the centre of curvature of at least one cylindrical reflecting surface of circular section which is so arranged that light from the source which falls thereon is reflected back through the source to the first mirror and is thereby reflected on to the element.

The optical projection system of this form of the invention includes an imaging system comprising the above-mentioned lens means and a number of reflecting surfaces or equivalent optical devices. The imaging system itself is arranged to form an image of each transverse strip element of the copy which is reversed along a direction parallel with the element but not perpendicularly thereof so that on turning the document and the photosensitised sheet with the copy thereon to face in the same direction a similar picture will be presented by both. To achieve this, the imaging system includes an odd number of optical reflecting surfaces or optically equivalent devices from the point of view of mirror imagery, preferably three such reflecting surfaces, one of which is the previously mentioned reflecting surface of the inner lens element. In this form of the invention, the other reflecting surfaces are two plane rectangular mirrors arranged to meet, or so that they would meet if extended, at right angles to each other along one edge to form a V-shaped construction extending transversely of the apparatus with each mirror in a plane at 45° to a plane passing between and parallel to the planes of the object and photosensitised sheet, the outer convex lens element facing the edge of the V-shaped mirror formation with its optical axis in the same plane as said edge which plane extends between and parallel to the planes of the document and sensitised sheet.

Relative movement between the illuminating system and optical projection system on the one hand and the object and sensitised sheet on the other hand may be achieved in any convenient manner. Thus, in the above-mentioned form of the invention, the object and sensitised sheet may be stationary and the projection system move along a track such that the optical axis remains unaltered, or the projection system may be fixed and the mounts for the document and sensitised surface may be arranged to move together as a single element. All three components may move, if desired. The means provided for moving the components of the apparatus may be a conventional driving mechanism including an electric motor which will move a component at a uniform rate.

The apparatus of the invention may be used to provide exact copies without enlargement or diminution. In such cases, the object and sensitised sheet should be fixed relative to one another and the optical system should be equidistant from the document and sensitised sheet.

In another form of copying system according to the invention, the object is held in the same plane as the sensitised sheet and a high speed lens means is laterally spaced from that plane with its axis intersecting the plane perpendicularly midway between the object and image locations. With this arrangement, which is useful for document copying rather than for copying rigid objects, the document and the sensitised sheet are moved simultaneously toward each other in their common plane at uniform speed.

Further objects and advantages of the invention will be apparent from a reading of the following description in conjunction with the accompanying drawings, in which:

FIGURE 1 is a view in longitudinal section partly schematic illustrating one form of copying system according to the invention; and FIGURE 2 is a view in longitudinal section partly schematic illustrating another form of copying system according to the invention.

In the embodiment of the invention shown in FIGURE 1, a document 10 to be copied is placed, face downwards, on a fixed flat glass plate 11. The sensitised sheet 12 is placed, sensitised surface upwards, on a fixed flat suction table 13 parallel to and about 8½ inches below the glass plate. An optical projection system 14 is mounted between the glass plate 11 and above the suction table 13 such that its optical axis 14a is parallel to the length of the document and equidistant from the document and sensitised sheet. In addition, there is an illuminating system which includes a tubular mercury arc lamp 15 disposed at one line focus of a cylindrical mirror 16 of part-elliptical section. A strip element 16a of the document to be illuminated is disposed at the other line focus of the mirror 16 and receives light emitted rearwardly by the lamp 15 and then reflected forwardly by the mirror.

The lamp 15 is also disposed at one line focus of a second cylindrical mirror 17, also of part-elliptical section, which is arranged to receive light emitted from the lamp 15 in directions forwardly of the mirror 16. Light from the lamp which falls upon the mirror 17 is reflected towards the other line focus 18 of that mirror and is finally reflected on to the strip element 16a by a plane mirror 19. Between the mirrors 16 and 17 is a cylindrical mirror 20 of circular section, and on the side of the optical axis 21 of the system remote from the mirror 17 is a further cylindrical mirror 22, also of circular section. The lamp 15 is arranged at the centres of curvature of mirrors 20 and 22 so that light from the lamp which falls on these mirrors is reflected back through the lamp on to the mirror 16, and thence to the strip element 16a of the document.

The optical projection system 14 of this embodiment includes two plane mirrors 23, 24 mounted at 45° to the plane containing the document, one mirror on each side of the optical axis 14a. In accordance with the invention, the projection system 14 also includes a lens system 25 comprising a plano-convex lens 25a, a plate 26 having one aspheric surface 26a to facilitate correction of spherical and extra-axial aberrations, and a doublet made up of a plano-convex lens 27 and a concave-convex lens 28, the latter element having a refractive rear surface 29 to provide a concave mirror. The lens curvatures are made sufficient to offset the Petzval field curvature of the concave mirror 29.

Heretofore, the extreme difficulty in fabricating aspheric lens elements to the required accuracy has made their use almost completely impracticable for optical systems requiring a high degree of correction. According to the invention, however, this difficulty is eliminated by providing a relatively low difference in refractive index between the aspheric element and the adjacent medium. In particular, the element 26 which is made of Perspex, having a refractive index of 1.508, is immersed in a body of water having a refractive index of 1.345. In this way, the sensitivity of the lens 25 to small errors in the manufacture of the aspheric surface 26a is greatly reduced, thereby substantially enlarging the tolerance or permissible variation range of the surface 26a and permitting the element 26 to be made relatively easily and, at the same time, produce a highly corrected image over a very large field. Preferably, the difference in refractive index between the aspheric element and the adjacent medium is less than about 0.30 although any reduction in the difference in refractive indices will, of course, increase the manufacturing tolerance required to maintain the desired performance characteristics. It will be understood, of course, that liquids other than water may be used to provide the reduced difference in refractive index between the aspheric element and the adjacent mediums. The water 30 or other liquid also acts to reduce the intensity of reflections from the lens surfaces which would otherwise reduce contrast in the reflected image.

The optical parameters and dimensions of the elements of the above projection system, corrected in the ultra-violet range for use with the diazo process, are preferably as follows (the dimensions being given in inch units):

|  | Radii | Axial Spacing | Refraction Index $\lambda=3{,}800$ A. | Diameter |
|---|---|---|---|---|
| Plano-convex lens (Crown glass). | 8<br>∞ | 1.4 | 1.536 | 8½ |
| Water | | 1.2 | 1.345 | |
| Aspheric plate (Perspex). | ∞<br>Aspheric | .25 | 1.508 | 7¼ |
| Water | | 3.5 | 1.345 | |
| Plano-convex lens (Crown glass). | ∞<br>+8 | 2.0 | 1.536 | 6½ |
| Concave-convex | −8<br>17 | 0.3 | 1.6567 | 6½ |

The curved surface of the aspheric plate is a figure of revolution in which the edge of a broadly concave curve is higher than the centre by an amount X at semi-aperture Y, where $$X = -0.00417Y^2 + 0.0047Y^4 - 0.000028Y^6 + 0.0000080Y^8$$

The optical projection system and the illuminating system are supported on each side by a frame 31 mounted on rollers 32 which run on a track 33 in the direction of the optical axis 14a. The illuminating and projection systems are driven at constant speed by an electric motor 34 and a drive belt 35 passing around a pulley 36 in order to scan the document 10.

In operation, the document 10 to be copied is held against the surface of the glass plate 11 and the sensitised sheet 12 is retained by suction against the table 13. The motor 34 then drives the illuminating and projection system between the document and the sensitised sheet, after which the sheet is removed for processing.

By means of the relative motion between the projection system and the document and sensitised sheet together, successive strip elements 16a of the document are imaged on to the sensitised sheet. In a single scanning operation from top to bottom of the document, the whole area of the document swept over by the strip element 16a will be copied on to the sensitised sheet. The apparatus may be adjusted so that such a single scan is sufficient to produce a good copy, in which case a quick return mechanism may be provided to return the projection system or document and sensitised sheet to their original positions. Alternatively and preferably, the apparatus may be adjusted so that it is necessary to scan the document from top to bottom and back to produce a good copy. The speed of scanning will depend to some extent on the intensity of illumination and sensitivity of the photo-sensitised sheet and should be adjusted to give the correct exposure for the document as a whole.

Normally, the illuminated and imaged strip element 16a will extend across the whole width of the document, typically about 8 inches. However, the apparatus may be modified to image documents where the illuminated strip element does not extend across the whole width of the document, e.g., where it extends only half way across. In this case, one-half width of the document is scanned in the normal way and imaged on to the corresponding part of the sensitised sheet. After this scanning operation, the document and sensitised sheet are moved in opposite directions parallel to the length of the strip element so as to bring the unscanned half width of the document in to conjunction with the projection system and the corresponding part of the sensitised sheet, and the unscanned part scanned as before.

The embodiment of the invention shown in FIGURE 2 eliminates the necessity for driving the lens and illuminating system and, instead, moves the document 10 to be copied and the sensitised paper 12 toward each other in the same plane at uniform speed. In this arrangement, the lens 25 is disposed in fixed position beneath the plane of the document and sensitised sheet so that its axis 14a intersects that plane midway between the document and the sensitised sheet. To move the document 10, friction drive rollers are arranged to receive it and carry it beneath a suction box 13a above the illuminated strip 16a, the illumination being provided by a tubular discharge lamp 15 and a single cylindrical reflector 16b of elliptical cross-section.

On the other side of the axis 14a, the sensitised sheet is carried by friction drive rollers 38 beneath another suction box 13a at which the illuminated strip 16a is imaged. The drive rollers 37 and 38 are synchronized to provide identical drive speeds and, to direct the document 10 and the sensitised sheet 12 away from their common plane after exposure, a guide is interposed in the plane at the inter-section of the lens axis 14a.

In operation, suction is applied to the suction boxes 13a to hold the document and the sensitised sheet in focus while they are driven by the rollers 37 and 38 in the directions indicated by the arrows. As the document and the sheet move, successive illuminated strips 16a are imaged at corresponding locations on the sensitised sheet so that a complete image is produced on that sheet, after which it is removed for processing. If desired, the document and the sensitised sheet may be drawn past the object and image strips by movable grippers rather than by friction rollers so as to assure perfect synchronisation and the directions of motion of the document and the sensitised sheet may, of course, be reversed.

In a second lens system suitable for use in each of the above-described copying systems the side of the aspheric plate 26 remote from the doublet 27, is convex rather than planar. The optical parameters and dimensions of the elements in this lens system are as follows (the dimensions being given in inch units):

| | Radii | Axial Spacing | Refractive Index |
|---|---|---|---|
| Plano-convex (Crown glass) | 8 / ∞ | 1.40 | 1.52 |
| Water | | 1.20 | 1.33 |
| Aspheric Plate (Methyl methacrylate) | 50 / Aspheric | 0.20 | 1.49 |
| Water | | 3.75 | 1.33 |
| Plano-convex (Crown glass) | ∞ / 8 | 0.80 | 1.52 |
| Concave-convex (Dense flint) | −8 / 17 | 0.30 | 1.62 |

The curved surface of the aspheric plate is a figure of revolution in which the edge of a broadly concave curve is higher than the centre by an amount X at semi-aperture Y where $$X = 0.006Y^2 + 0.0049Y^4 - 0.000036Y^6 + 0.0000080Y^8 + 0.00000005Y^{10}$$

Each of the above described copying systems produces a copy of the same size as the object, i.e., the image projection means 25 of the system is operating at unit magnification. This means that both the object, strip element 16a, and the image projected on to sheet 12 are located at the centre of curvature of the concave mirror 29, or at an optically equivalent location thereto in the case of the system including additional, plane mirrors 23 and 24 illustrated in FIGURE 1. With an object and image located at its centre of curvature a concave mirror produces neither spherical aberration nor coma, but there is severe field astigmatism and curvature of field.

In each of the above lens systems the Petzval field curvature arising at the concave mirror surface 29 is mainly offset by that arising at the convex surface of the plano-convex lens 25a, which faces away from the mirror. The spherical aberration arising at the convex surface of lens 25a and the astigmatism of field arising at the concave mirror surface 29 are mainly offset by the compensating aberrations arising at the aspheric surface 26a of the plate 26, this surface 26a being generally concave and facing towards the concave mirror.

The paraxial curvatures of the elements in the lens system are so chosen that the sum of their contributions to the Petzval field curvature is zero and a flat image of a flat object is formed.

The doublet made up of plano-convex lens 27 and concave-convex lens 28 serves to correct chromatic aberrations whilst the water 30 in which the aspheric plate 26 is immersed serves to prevent unwanted surface reflections and, consequently, stray light.

It will be appreciated that the concave reflecting surface 29 may be formed on an additional element and the doublet 27, 28 can be arranged between the aspheric plate 26 and the plano-convex lens 25a. The doublet can be formed of a bi-convex crown lens and a bi-concave flint lens instead of the above-described plano-convex lens 27 and concave-convex lens 28.

In an alternative form of the invention a single lens element is used in place of the plano-convex lens 25a and the aspheric plate 26a, one surface of this element being formed to correspond with the convex surface of lens 25a and the other surface corresponding with the aspheric surface corresponding with the aspheric surface 26a of plate 26.

Each of the lens systems described above with reference to FIGURES 1 and 2 of the drawings produces a flat, anastigmatic field of view at unit magnification and with angular apertures approaching f/2.

In the field of office copying, one of the best established process is the use of diazo coated paper or similar materials for copying from translucent originals. One reason for the popularity of this process is that diazo coated materials are the least expensive of all photosensitised materials. It has been known for many years that a copying device which would enable a copy to be made from the surface of a document by reflection on to diazo paper would have wide and valuable applications in industry. The present invention provides a means for copying a document from the surface on to a photosensitised sheet of a diazo nature.

Although the invention has been described herein with reference to specific embodiments, many modifications and variations therein will readily occur to those skilled in the art. Accordingly, all such variations and modifications are included within the intended scope of the invention as defined by the following claims.

I claim:

1. Apparatus for copying comprising first retaining means for holding an object to be copied at a first location, second retaining means for holding sensitized material at a second location spaced from the first location, and image projection lens means optically interposed between the first and second locations so as to produce at the second location an image of an object disposed at the first location, wherein the image projection lens means is of the catadioptric type having a reflecting surface whereby light passing through the lens means is reflected back through the same lens means to form the image, and the lens means also includes an aspheric lens element for correction of distortion and aberrations, whereby a minimum axial dimension of the lens means is required so as to permit a high lens speed.

2. Apparatus for copying according to claim 1 wherein the image projection means produces at the second location an image of an elongated strip portion of an object disposed at the first location.

3. Apparatus according to claim 2 including drive means for imparting relative motion between the image projection means and the object in a direction transverse to the direction of the elongated strip so as to produce a composite image comprised of a succession of elongated strip portions of the object.

4. Apparatus according to claim 2 including drive means for imparting relative motion between the image projection means and the sensitized material in a direction transverse to the direction of the elongated strip so as to produce a composite image comprised of a succession of elongated strip portions of the object.

5. Apparatus according to claim 2 including drive means for imparting relative motion between the image projection means on the one hand and the object and the sensitized material on the other hand in a direction transverse to the direction of the elongated strip so as to produce a composite image comprised of a succession of elongated strip portions of the object.

6. Apparatus according to claim 1 wherein the image projection means is disposed between two parallel planes in which the object and the sensitised material are disposed, for relative motion between those planes.

7. Apparatus according to claim 1 wherein the aspheric element means in the image projection means has a refractive index which differs from that of the adjacent medium by a relatively low value.

8. Apparatus according to claim 1 wherein the image projection means is laterally spaced from a plane in which the object and the sensitised material are disposed.

9. Apparatus for copying comprising first retaining means for holding an object to be copied at a first location, second retaining means for holding sensitised material at a second location spaced from the first location, image projection means optically interposed between the first and second locations so as to produce at the second location an image of an elongated strip portion of an object disposed at the first location, aspheric lens element means in the image projection means to eliminate distortions and aberrations, and drive means for imparting relative motion between the image projection means and the object in a direction transverse to the direction of the elongated strip so as to produce a composite image comprised of a succession of elongated strip portions of the object.

10. Apparatus for copying comprising first retaining means for holding an object to be copied at a first location, second retaining means for holding sensitised material at a second location spaced from the first location, image projection means optically interposed between the first and second locations so as to produce at the second location an image of an elongated strip portion of an object disposed at the first location, aspheric lens element means in the image projection means to eliminate distortions and aberrations, and drive means for imparting relative motion between the image projection means and the sensitised material in a direction transverse to the direction of the elongated strip so as to produce a composite image comprised of a succession of elongated strip portions of the object.

11. Apparatus for copying comprising first retaining means for holding an object to be copied at a first location, second retaining means for holding sensitised material at a second location spaced from the first location, image projection means optically interposed between the first and second locations so as to produce at the second location an image of an elongated strip portion of an object disposed at the first location, aspheric lens element means in the image projection means to eliminate distortions and aberrations, and drive means for imparting relative motion between the image projection means on the one hand and the object and the sensitised material on the other hand in a direction transverse to the direction of the elongated strip so as to provide a composite image comprised of a succession of elongated strip portions of the object.

12. Apparatus for copying comprising first retaining means for holding an object to be copied in a first plane, second retaining means for holding sensitised material in a second plane parallel to and laterally spaced from the first plane, image projection means disposed between the first and second planes for relative motion parallel thereto so as to produce in the second plane an image of an elongated strip portion of an object disposed in the first plane, and drive means for moving the image projection means between the first and second planes in a direction transverse to the direction of elongation of the strip portion so as to produce a composite image comprised of a succession of elongated strip portions of the object.

13. Apparatus according to claim 12 wherein the image projection means comprises lens means having its optical axis parallel to the direction of motion of the image projection means, reflecting means at one end of the lens means to reflect light from the object plane into the lens means and to reflect light from the lens means to the plane of the sensitised material, and further reflecting means at the opposite end of the lens means to reflect light back through the lens means.

14. Apparatus according to claim 12 wherein the image projection means comprises lens means including an aspheric element having a refractive index which differs from that of the adjacent medium by a relatively low value.

15. Apparatus according to claim 12 including illuminating means for illuminating the elongated strip portion of the object comprising an elongated light source, first cylindrical reflector means disposed behind the light source with respect to the elongated strip for imaging the light source at the location of the elongated strip at an oblique angle to the plane of the object, second cylindrical reflector means disposed between the light source and the plane of the object and planar reflecting means on the opposite side of the elongated strip arranged to image the light source at the location of the elongated strip, and further cylindrical reflector means at angular positions between the first and second reflector means for reflecting light back toward the elongated light source.

16. Apparatus for copying comprising first retaining means for holding an object to be copied at a first location in a given plane, second retaining means for holding sensitised material at a second location in the same plane spaced from the first location, image projection means comprising lens means laterally spaced from the plane of the object and the sensitised material so as to produce at the second location an image of an elongated strip portion of an object disposed at the first location, and drive means for moving the object to be copied and the sensitised material in their common plane simultaneously in opposite directions transverse to the direction of elongation of the strip portion to produce a composite image comprised of a succession of elongated strip portions of the object.

17. Apparatus according to claim 16 wherein the lens means is disposed with its optical axis extending midway between the first and second locations and perpendicular to the given plane, and reflecting means at the opposite end of the lens means from the given plane to reflect light back through the lens means.

18. Apparatus according to claim 16 wherein the lens means includes an aspheric element having a refractive index which differs from that of the adjacent medium by a relatively low value.

19. Apparatus for copying, by reflection, comprising first retaining means for holding an object to be copied in a first plane, second retaining means for holding sensitised material in a second plane parallel to and laterally spaced from and facing the first plane, image projection means disposed between the first and second planes for relative motion parallel thereto so as to produce in the second plane an image of an elongated strip portion of an object disposed in the first plane, drive means for moving the image projection means between the first and second planes for relative motion parallel thereto so as to produce in the second plane an image of an elongated strip portion of an object disposed in the first plane, the image projection means including lens means having its optical axis parallel to the direction of motion of the image projection means, an aspheric element in the lens means having a refractive index which differs from that of the adjacent medium by a relatively low value, an elongated light source means movable with the image projection means for illuminating the elongated strip portion of the object, reflecting means at one end of the lens means to reflect light reflected from an object in the object plane into the lens means and to reflect light from the lens means toward the plane of the sensitised material, and further reflecting means at the opposite end of the lens means to reflect light back through the lens means.

20. Apparatus for copying, by reflection, comprising first retaining means for holding an object to be copied in a given plane, second retaining means for holding sensitised material at a second location in the same plane, image projection means comprising lens means laterally spaced from the plane of the object and the sensitised material so as to produce at the second location an image of an elongated strip portion of an object disposed at the first location, an elongated light source means for illuminating the elongated strip portion of the object, the lens means being disposed with its optical axis extending midway between the first and second locations and perpendicular to the given plane and including an aspheric element having a refractive index which differs from that of the adjacent medium by a relatively low value, reflecting means at the end of the lens means opposite to the given plane to reflect light back through the lens means, and drive means for moving the object to be copied and the sensitised material in their common plane simultaneously in opposite directions transverse to the direction of elongation of the strip portion to produce a composite image comprised of a succession of elongated strip portions of the object.

21. Image projection means comprising concave reflecting means, converging lens means disposed between the said reflecting means and the centre of curvature thereof and adapted substantially to compensate for curvature of field arising at the reflecting means, and aspheric lens means including an aspheric surface disposed between the reflecting means and the centre of curvature thereof and adapted substantially to compensate for astigmatic aberrations arising at the reflecting means and spherical aberrations arising at the convex surface of the converging lens means.

22. Image projection means as claimed in claim 21, wherein the aspheric lens means is disposed between the reflecting means and the converging lens means.

23. Image projection means as claimed in claim 22, wherein the converging lens means includes a convex surface which faces in a direction away from the reflecting means, and the aspheric surface faces the reflecting means.

24. Image projection means as claimed in claim 21, wherein the converging lens means is a convex lens.

25. Image projection means as claimed in claim 21, wherein the aspheric lens means is an aspheric plate.

26. Image projection means as claimed in claim 21, comprising a lens element having a first surface which forms the aspheric surface of the aspheric lens means and a second surface which forms the convex surface of the converging lens means.

27. Image projection means as claimed in claim 21, including the means for correcting chromatic aberration comprising a doublet of crown and flint glass, the cemented surface of the flint glass being concave.

28. Image projection means as claimed in claim 25, wherein the means for correcting chromatic aberration is a doublet of crown and flint glass and an outer, convex surface of the doublet is adapted to form the said concave reflecting means.

References Cited
UNITED STATES PATENTS

| | | | |
|---|---|---|---|
| 2,084,450 | 6/1937 | Paris | 88—24 |
| 2,890,621 | 6/1959 | Suits | 88—24 |

JOHN M. HORAN, *Primary Examiner.*

NORTON ANSHER, *Examiner.*

R. A. WINTERCORN, *Assistant Examiner.*